United States Patent
Wang et al.

(10) Patent No.: US 11,774,993 B2
(45) Date of Patent: Oct. 3, 2023

(54) POWER SUPPLY MANAGEMENT DEVICE AND POWER SUPPLY MANAGEMENT METHOD

(71) Applicant: REALTEK SEMICONDUCTOR CORPORATION, Hsinchu (TW)

(72) Inventors: Zhan-Peng Wang, Suzhou (CN); Su-Hang Chen, Suzhou (CN); Bin Sun, Suzhou (CN); Qing-Zhe Qiu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/870,965

(22) Filed: Jul. 22, 2022

(65) Prior Publication Data
US 2023/0152829 A1 May 18, 2023

(30) Foreign Application Priority Data
Nov. 12, 2021 (CN) .......................... 202111337985.3

(51) Int. Cl.
G05F 1/56 (2006.01)
G05F 1/565 (2006.01)
G05F 1/46 (2006.01)

(52) U.S. Cl.
CPC .............. G05F 1/565 (2013.01); G05F 1/465 (2013.01)

(58) Field of Classification Search
None
See application file for complete search history.

(56) References Cited

U.S. PATENT DOCUMENTS

| | | | | |
|---|---|---|---|---|
| 7,382,064 B2* | 6/2008 | Jaisinghani | ...... | G01R 19/16576 307/87 |
| 7,940,101 B2* | 5/2011 | Rai | .......................... | H03K 5/05 327/170 |
| 8,026,636 B2* | 9/2011 | Oh | ............................ | G05F 1/46 307/31 |
| 9,819,189 B2* | 11/2017 | Shi | ........................ | G06F 1/3287 |
| 9,823,719 B2* | 11/2017 | Jahagirdar | ............ | G06F 1/3243 |
| 11,188,107 B2* | 11/2021 | Sato | ........................ | H02J 9/002 |
| 11,295,787 B1* | 4/2022 | Gunther | ................. | G11C 5/147 |
| 11,387,676 B2* | 7/2022 | Ng | .......................... | H02M 1/36 |
| 2016/0226380 A1* | 8/2016 | Matsumoto | ........... | H02M 3/158 |

* cited by examiner

Primary Examiner — Thomas J. Hiltunen
(74) Attorney, Agent, or Firm — WPAT, P.C

(57) ABSTRACT

A power supply management device includes an internal power supply circuit, switches, a comparator circuit, and a control circuit. The internal power supply circuit is configured to output a first supply voltage to a node. The switches are coupled between the node and a plurality of first circuits. The comparator circuit is configured to compare a voltage on the node with a reference voltage when the node does not receive the first supply voltage to generate a flag signal. The control circuit is configured to determine whether the node receives a second supply voltage from an external power supply circuit according to the flag signal. If the node receives the second supply voltage, the control circuit is further configured to turn off the internal power supply circuit and gradually turn on the switches, in order to provide the second supply voltage to the first circuits via the switches.

17 Claims, 4 Drawing Sheets

US 11,774,993 B2

POWER SUPPLY MANAGEMENT DEVICE AND POWER SUPPLY MANAGEMENT METHOD

BACKGROUND OF THE INVENTION

1. Field of the Invention

The present disclosure relates to a power supply management device, especially to a power supply management device able to switch an internal power supply circuit and an external power supply circuit and a power supply management method thereof.

2. Description of Related Art

In an existing approach, a high-performance chip is powered by an external power supply circuit arranged outside the chip to lower the operating temperature of the chip. In the above approach, the chip requires communicating with the external power supply circuit through a port (for example, detecting whether the external power supply circuit is connected, providing a control signal for power switch, etc.). As a result, the number of ports available on the chip will be reduced.

SUMMARY OF THE INVENTION

In some aspects of the present disclosure, one of the objects of the present disclosure is, but not limited to, to provide a power supply management device and a power supply management method which can detect the external power supply circuit and determine whether to utilize the voltage provided from an external power supply circuit without additional connection ports.

In some aspects of the present disclosure, a power supply management device includes an internal power supply circuit, switches, a comparator circuit, and a control circuit. The internal power supply circuit is configured to output a first supply voltage to a node. The switches are coupled between the node and a plurality of first circuits. The comparator circuit is configured to compare a voltage on the node with a reference voltage when the node does not receive the first supply voltage to generate a flag signal. The control circuit is configured to determine whether the node receives a second supply voltage from an external power supply circuit according to the flag signal. If the node receives the second supply voltage, the control circuit is further configured to turn off the internal power supply circuit and gradually turn on the switches, in order to provide the second supply voltage to the first circuits via the switches.

In some aspects of the present disclosure, a power supply management method includes the following operations: comparing a voltage on a node with a reference voltage when the node does not receive a first supply voltage to generate a flag signal, in which the node is coupled to switches and first circuits, and the first supply voltage is from an internal power supply circuit; determining whether the node receives a second supply voltage from an external power supply circuit according to the flag signal; and if the node receives the second supply voltage, turning off the internal power supply circuit and gradually turning on the switches, in order to provide the second supply voltage to the first circuits via the plurality of switches.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
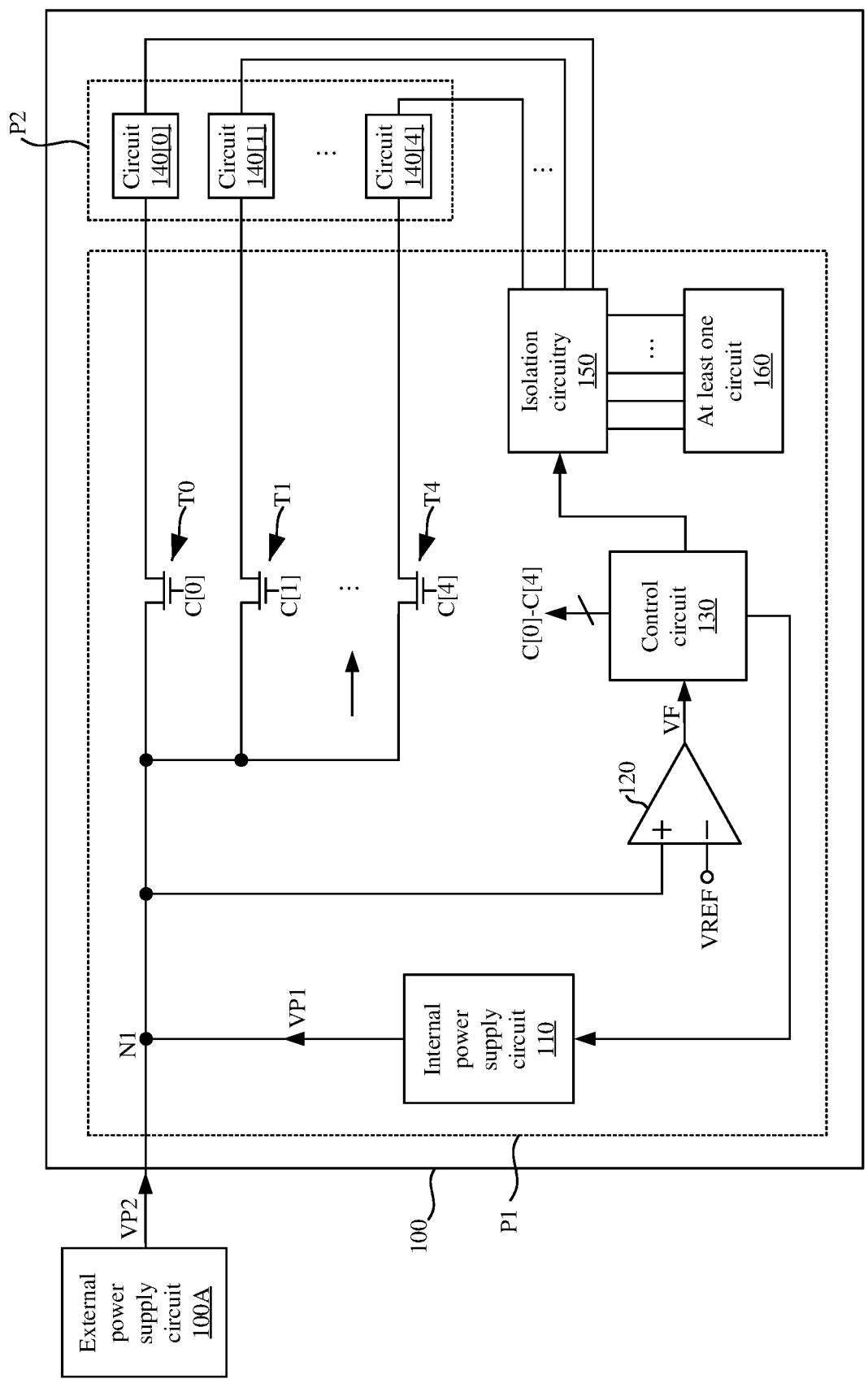
FIG. 1 shows a schematic diagram of a power supply management device according to some embodiments of the present disclosure.

FIG. 1 shows a schematic diagram of a power supply management device 100 according to some embodiments of the present disclosure. In some embodiments, the power supply management device 100 may be applied to an electronic device and/or a chip having a power saving mode. Under the power saving mode, part circuits in the electronic device are turned off to save power consumption. Alternatively, under a normal mode, most circuits in the electronic device are turned on to perform normal functions.

The power supply management device 100 includes an internal power supply circuit 110, switches T0-T4, a comparator circuit 120, a control circuit 130, and circuits 140[0]-140[4]. The internal power supply circuit 110, the switches T0-T4, the comparator circuit 120, and the control circuit 130 operate in a power domain P1, and the circuits 140[0]-140[4] operate in a power domain P2. In some embodiments, the power domain P1 is a ON domain, and the power domain P2 is an OFF domain. In other words, the circuits 140[0]-140[4] that operate in the power domain P2 will be turned off under the power saving mode, in order to save power consumption. In different embodiments, the circuits 140[0]-140[4] may be, but not limited to, digital circuits and/or mixed signal circuits. In some embodiments, one or more circuits in the circuits 140[0]-140[4] may commonly form a circuitry. Alternatively, in some other embodiments, one or more circuits in the circuits 140[0]-140[4] are independent to each other.

The internal power supply circuit 110 is configured to output a supply voltage VP1 to a node N1. In some embodiments, the internal power supply circuit 110 may be a power converter circuit, which may be, for example but not limited to, a DC to DC converter circuit. In some embodiments, the internal power supply circuit 110 may be a low dropout regulator (LDO) circuit.

The switches T0-T4 are coupled between the node N1 and the circuits 140[0]-140[4], and are turned on respectively according to control bits C[0]-C[4]. In greater detail, first terminals of the switches T0-T4 are coupled to the node N1, second terminals of the switches T0-T4 are respectively coupled to the circuits 140[0]-140[4], and control terminals of the switches T0-T4 respectively receive the control bits C[0]-C[4]. As a result, when the switches T0-T4 are turned on, a voltage on the node N1 (e.g., the supply voltage VP1 or VP2) may be transmitted to the circuits 140[0]-140[4] to drive the circuits 140[0]-140[4]. Alternatively, when the switches T0-T4 are turned off, the voltage on the node N1 is not transmitted to the circuits 140[0]-140[4]. Under this condition, the circuits 140[0]-140[4] are turned off, in order to operate in the power saving mode.

In some application scenarios, an external power supply circuit 100A is utilized. In those applications, the power supply management device 100 may be coupled to the external power supply circuit 100A, such that the node N1 receives a supply voltage VP2 from the external power supply circuit 100A. For example, the power supply management device 100 may be applied to a device having a universal serial bus (USB). The external power supply circuit 100A may be a power converter circuit or an LDO circuit in a USB host. As a result, when the USB device is connected to the USB host, the node N1 may receive the supply voltage VP2 from the external power supply circuit 100A. In some embodiments, if the power supply management device 100 is applied to a USB device, the power saving mode may be, but not limited to, a suspend state defined in a USB protocol.

The comparator circuit 120 is configured to compare the voltage on the node N1 with a reference voltage VREF when the node N1 does not receive the supply voltage VP1, in order to generate a flag signal VF. For example, when the internal power supply circuit 110 is turned off, the internal power supply circuit 110 stops outputting the supply voltage VP1. Under this condition, if the external power supply circuit 100A exists in in application environment, the voltage on the node N1 will be the supply voltage VP2. As a result, the voltage on the node N1 is higher than the reference voltage VREF, and thus the comparator circuit 120 outputs the flag signal VF having a first logic value (e.g., a logic value of 1). Alternatively, if the external power supply circuit 100A does not exist in the application environment, the voltage on the node N1 will be zero. Under this condition, the voltage on the node N1 is lower than the reference voltage VREF, and thus the comparator circuit 120 may output the flag signal VF having a second logic value (e.g., a logic value of 0). As a result, whether the external power supply circuit 100A exists in the current application environment can be determined according to the flag signal VF.

The control circuit 130 is configured to determine whether the node N1 receives the supply voltage VP2 from the external power supply circuit 100A according to the flag signal VF. If the node N1 receives the supply voltage VP2 (i.e., when the flag signal VF has the first logic value), it indicates that the external power supply circuit 100A exists in the current application environment. Under this condition, the control circuit 130 may turn off the internal power supply circuit 110, and output the control bits C[0]-C[4] to gradually turn on the switches T0-T4, in order to provide the supply voltage VP2 to the circuits 140[0]-140[4] via the switches T0-T4. As a result, the circuits 140[0]-140[4] may sequentially receive the supply voltage VP2 via the switches T0-T4 and start operating. In addition, as the external power supply circuit 100A is arranged outside the power supply management device 100, by utilizing the external power supply circuit 100A (rather than the internal power supply circuit 110) to supply power, it is able to reduce the heat generated by the power supply management device 100 to lower the operating temperature of the power supply management device 100. In some embodiments, the control circuit 130 may be, but not limited to, a microcontroller or a processor circuit, which may perform operations in FIG. 2.

Alternatively, if the node N1 does not receive the supply voltage VP2 (i.e., when the flag signal VF has the second logic value), it indicates that the external power supply circuit 100A does not exist in the current application environment. Under this condition, the control circuit 130 may turn on the internal power supply circuit 110 (or keep the internal power supply circuit 110 being turned on), and output the control bits C[0]-C[4] to gradually turn on the switches T0-T4, in order to provide the supply voltage VP1 to the circuits 140[0]-140[4] via the switches T0-T4. As a result, the circuits 140[0]-140[4] may sequentially receive the supply voltage VP1 via the switches T0-T4 and start operating. With the above operations, the control circuit 130 may perform a soft-start operation according to the flag signal VF to generate the control bits C[0]-C[4] to gradually turn on the switches T0-T4, in order to transmit the supply voltage VP1 or the supply voltage VP2 to the circuits 140[0]-140[4].

In some embodiments, the power supply management device 100 further includes an isolation circuitry 150 and at least one circuit 160. The isolation circuitry 150 and the at least one circuit 160 operate in the power domain P1. In some embodiments, the at least one circuit 160 may include, but not limited to, a clock generator circuit (not shown), at least one digital circuit (not shown), at least one mixed signal circuit (not shown), and so on. The clock generator circuit may be configured to generate clock signal(s) required by other circuit(s). The at least one digital circuit and/or the at least one mixed signal circuit may be utilized to perform the normal operations (which may be different according to practical applications) and necessary operations under the power saving mode (which may include, but not limited to, keep data being not lost).

In some embodiments, the isolation circuitry 150 is coupled to between the at least one circuit 160 and the circuits 140[0]-140[4]. The isolation circuitry 150 may be configured to isolate the power domain P1 from the power domain P2. In the progress of the voltage on the node N1 being switched from the supply voltage VP1 to the supply voltage VP2, the control circuit 130 may perform a power isolation operation with the isolation circuitry 150, in order to isolate the power domain P1 from the power domain P2. As a result, it can prevent the circuits 140[0]-140[4] that operate in the power saving mode from generating unknown signals, and thus avoiding errors in operation of the at least one circuit 160 (and/or other circuits) in the power domain P1. In some embodiments, the isolation circuitry 150 may include, but not limited to, isolation cell circuits and/or level shifter circuits, in order to adjust levels of internal nodes of the circuits 140[0]-140[4] to be a predetermined level.

In some related approaches, an existing chip requires an additional connection port (which may be, but not limited to, a general purpose input/output (GPIO) pin) to control an external power supply circuit, in order to detect whether the external power supply circuit is connected or to control external power supply circuit to start providing an supply voltage to the chip. As a result, at least one connection port is occupied to implement an external power supply management. Compared with the above approaches, in some embodiments of the present disclosure, the power supply management device 100 is able to determine whether the external power supply circuit 100A is connected without utilizing an additional connection port having control ability or ability of transferring information (which may be, but not limited to, GPIO pin) to connect the external power supply circuit 100A, and the control circuit 130 is able to receive the flag signal VF without utilizing the additional connection port, in order to automatically determine whether to utilize the supply voltage VP2 provided from the external power supply circuit 100A. As a result, a number of pins of the chip can be saved.

Figure 2:
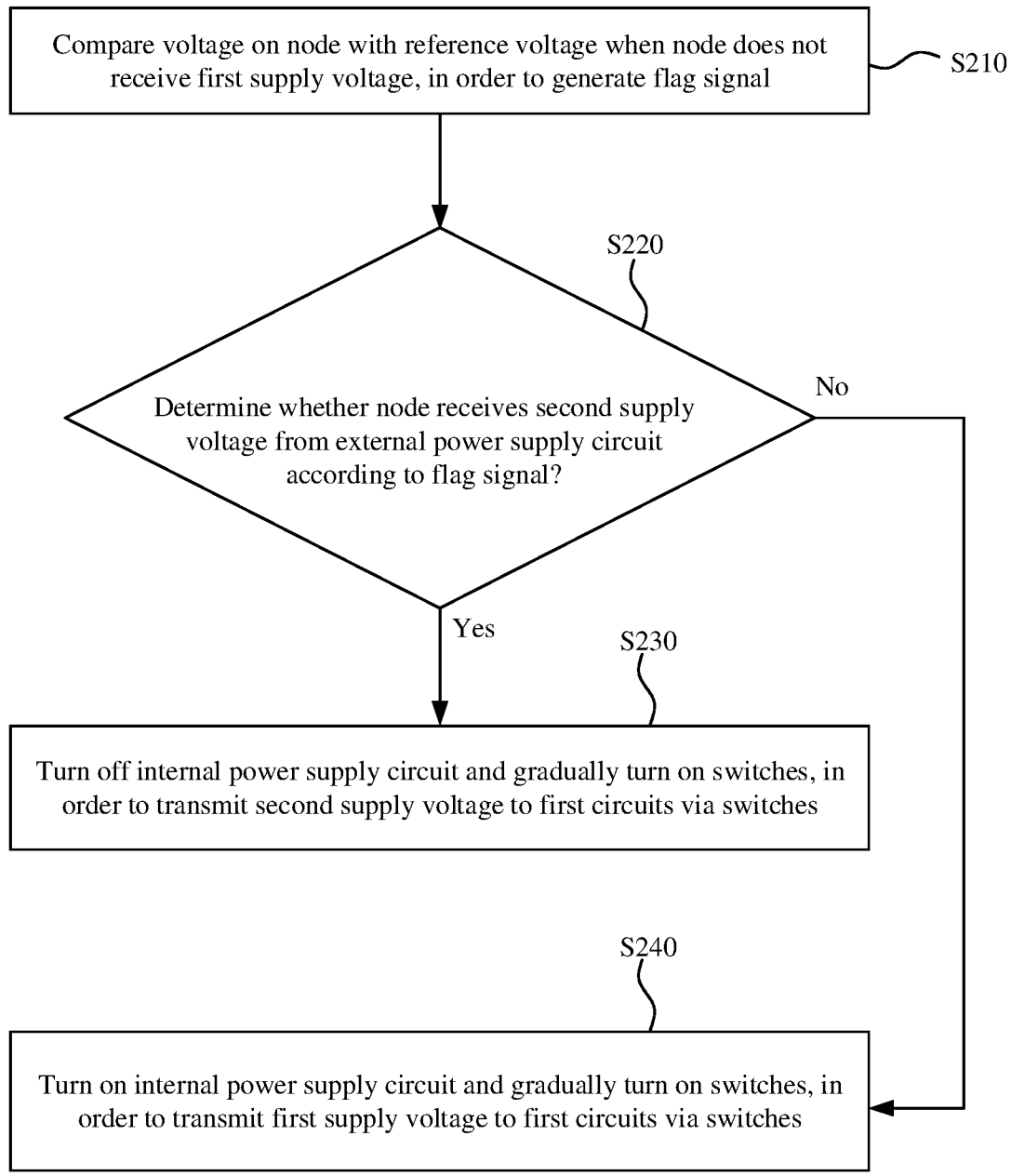
FIG. 2 shows a flow chart of a power supply management method according to some embodiments of the present disclosure.

FIG. 2 shows a flow chart of a power supply management method 200 according to some embodiments of the present disclosure. In some embodiments, the power supply management method 200 may be performed by the control circuit 130 in FIG. 1. In some embodiments, the power supply management method 200 may be implemented with firmware or software, and the control circuit 130 may execute the firmware or the software to perform operations in the power supply management method 200.

In operation S210, a voltage on a node (e.g., the node N1) is compared with a reference voltage (e.g., the reference voltage VREF) when the node (e.g., the node N1) does not receive a first supply voltage (e.g., the supply voltage VP1), in order to generate a flag signal (e.g., the flag signal VF).

In operation S220, whether the node receives a second supply voltage (e.g., the supply voltage VP2) from an external power supply circuit (e.g., the external power supply circuit 100A) is determined according to the flag signal. If the node receives the second supply voltage, operation S230 is performed. Alternatively, if the node does not receive the second supply voltage, operation S240 is performed. For example, as mentioned above, when the flag signal VF has the first logic value, it indicates that the node N1 receives the supply voltage VP2, and is thus able to determine that the external power supply circuit 100A exists in the current application environment. Alternatively, when the flag signal VF has the second logic value, it indicates that the node N1 does not receive the supply voltage VP2, and is thus able to determine that the external power supply circuit 100A does not exist in the current application environment.

In operation S230, the internal power supply circuit is turned off and switches are gradually turned on, in order to transmit the second supply voltage to first circuits (e.g., the circuits 140[0]-140[4]) via the switches. In operation S240, the internal power supply circuit is turned on and switches are gradually turned on, in order to transmit the first supply voltage to the first circuits via the switches. For example, if the external power supply circuit 100A exists in the current application environment, the control circuit 130 may turn off the internal power supply circuit 110 and output the control bits C[0]-C[4] to gradually turn on the switches T0-T4. As a result, the external power supply circuit 100A may transmit the supply voltage VP2 to the circuits 140[0]-140[4] via the switches T0-T4. Alternatively, if the external power supply circuit 100A does not exist in the current application environment, the control circuit 130 may keep the internal power supply circuit 110 being turned on, and output the control bits C[0]-C[4] to gradually turn on the switches T0-T4. As a result, the internal power supply circuit 110 may transmit the supply voltage VP1 to the circuits 140[0]-140[4] via the switches T0-T4.

Figure 3A:
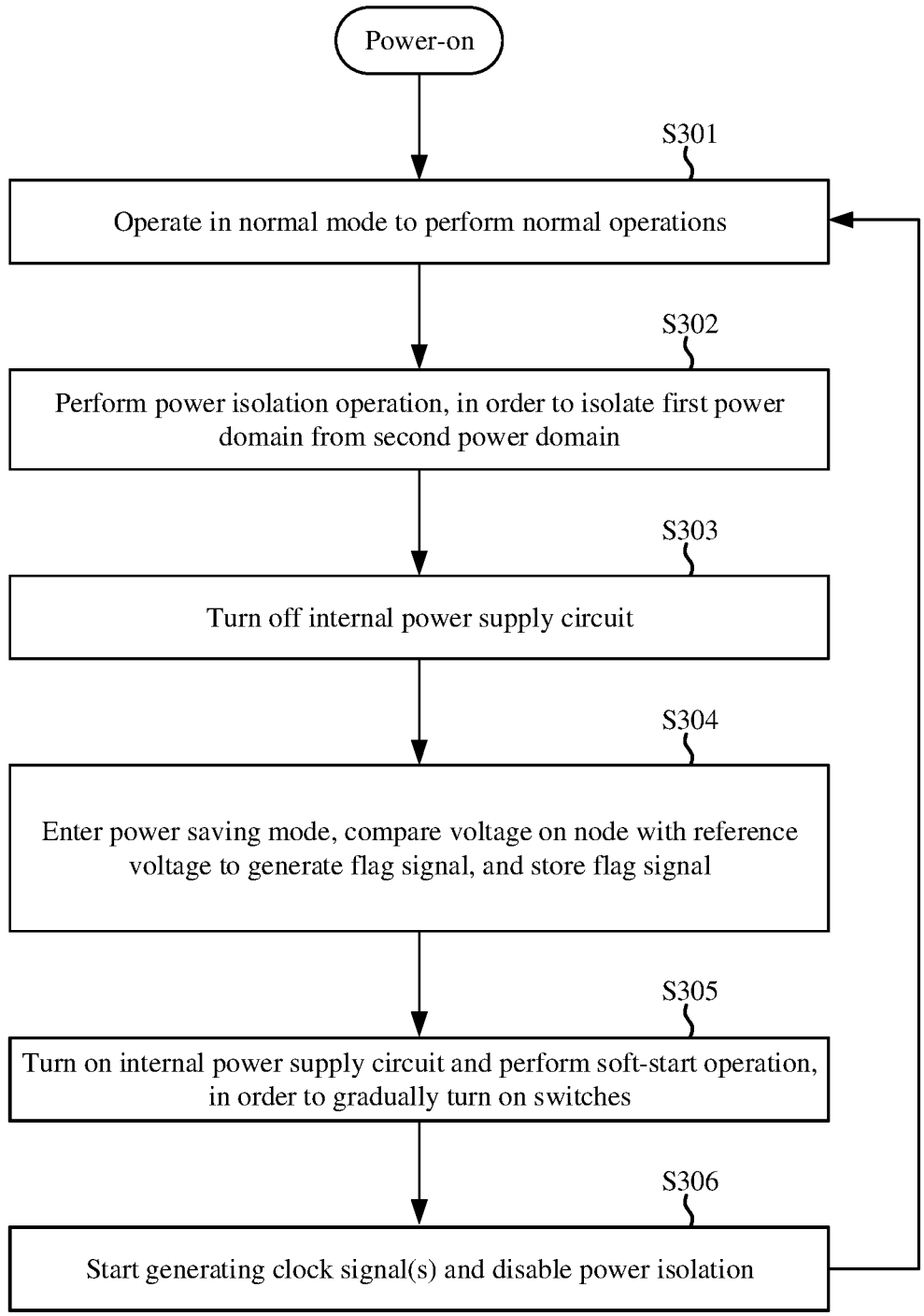
FIG. 3A shows a flow chart of the power supply management device in FIG. 1 entering and exiting the power saving mode for the first time after power-on according to some embodiments of the present disclosure.
Figure 3B:
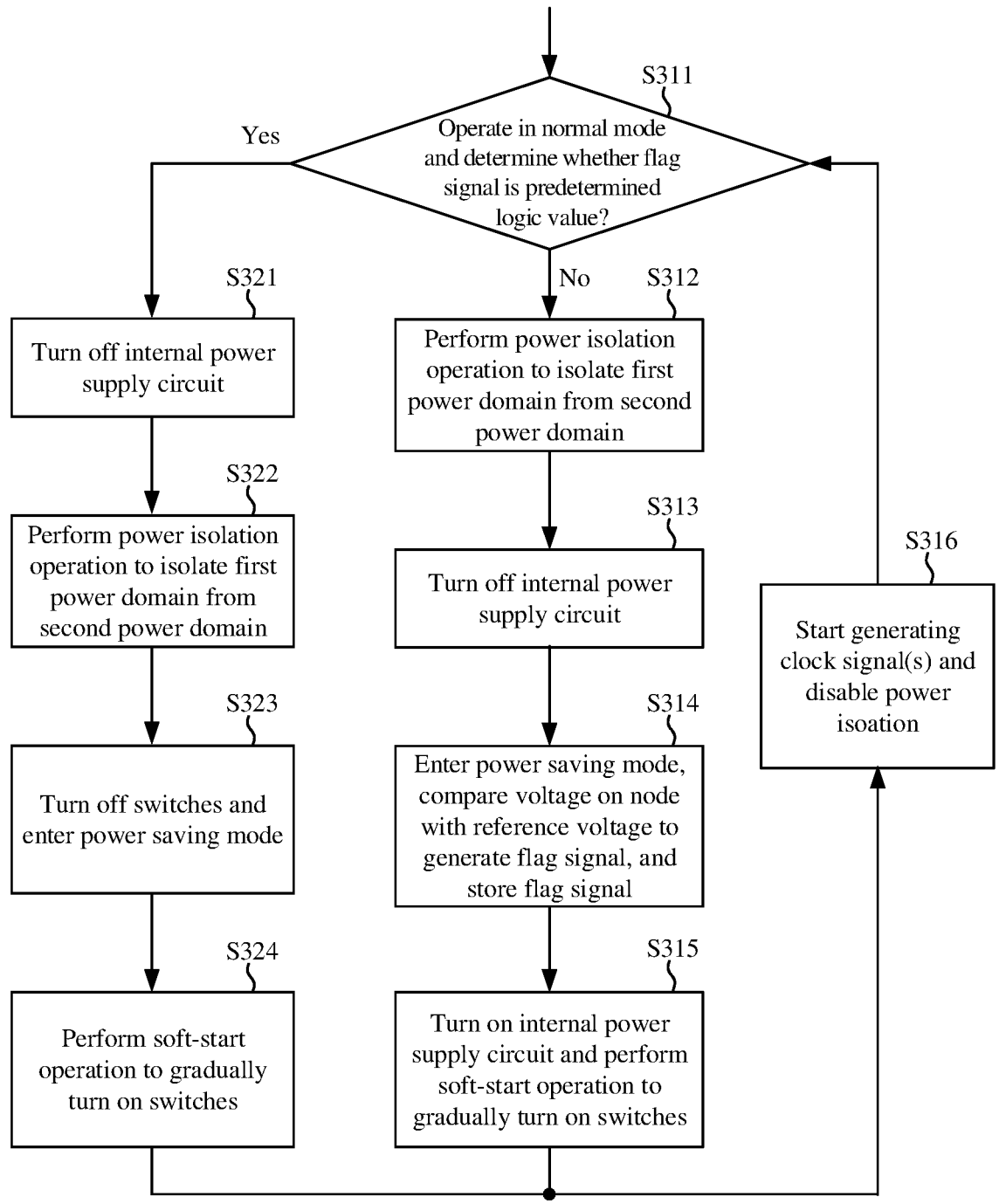
FIG. 3B shows a flow chart of the power supply management device in FIG. 1 entering and existing the power saving mode in subsequent operation(s) according to some embodiments of the present disclosure.

FIG. 3A shows a flow chart of the power supply management device 100 in FIG. 1 entering and exiting the power saving mode for the first time after power-on according to some embodiments of the present disclosure, and FIG. 3B shows a flow chart of the power supply management device 100 in FIG. 1 entering and existing the power saving mode in subsequent operation(s) according to some embodiments of the present disclosure. Various steps shown in FIG. 3A and FIG. 3B may correspond to at least one of operations in FIG. 2. For example, step 303, step 304, step 313, and step 314 correspond to operation S210, step S311 corresponds to operation S220, steps 321-324 correspond to operation S230, and step 305 and step 315 correspond to operation S240.

Reference is made to FIG. 3A. In step S301, operating in normal mode after power-on, in order to perform normal operations. For example, when the power supply management device 100 is powered on, all circuits (or most circuits) in the power supply management device 100 are turned on to operate in the normal mode to perform normal operations.

In step S302, a power isolation operation is performed to isolate a first power domain (e.g., the power domain P1) from a second power domain (e.g., the power domain P2). For example, the control circuit 130 may perform the power isolation operation with the isolation circuitry 150, in order to isolate the power domain P1 from the power domain P2.

In step S303, the internal power supply circuit (e.g., the internal power supply circuit 110) is turned off. In step S304, the power saving mode is entered and the voltage on the node is compared with the reference voltage to generate the flag signal, and the flags signal is stored. For example, the control circuit 130 may turn off the internal power supply circuit 110. Under this condition, the node N1 does not receive the supply voltage VP1, and the circuits 140[0]-140[4] are turned off and enter the power saving mode. The comparator circuit 120 may compare the voltage on the node N1 with the reference voltage VREF to generate the flag signal VF when the circuits 140[0]-140[4] operate in the power saving mode for the first time, in order to determine whether the external power supply circuit 100A exists in the current application environment. In some embodiments, the control circuit 130 includes a register, which may be configured to store the flag signal VF when the circuits 140[0]-140[4] operates in the power saving mode for the first time. In other words, the control circuit 130 may store the flag signal VF when the power supply management device 100 enters the power saving mode for the first time after power-on, in order to determine whether to utilize the internal power supply circuit 110 in subsequent operations.

In step S305, the internal power supply circuit is turned on and the soft-start operation is performed to gradually turn on the switches. In step S306, a clock signal is started generating and the power isolation is disabled, in order to operate in the normal mode. For example, when the power supply management device 100 is going to exit the power saving mode, the control circuit 130 may turn on the internal power supply circuit 110 and perform the soft-start operation to output the control bits C[0]-C[4], in order to gradually turn on the switches T0-T4. As a result, the internal power supply circuit 110 may power (or drive) the circuits 140[0]-140[4] via the switches T0-T4 (i.e., providing the supply voltage VP1). Afterwards, the control circuit 130 may control the clock generator circuit in the at least one circuit 160 to start generating clock signal(s) required by various circuits, and control the isolation circuitry 150 to disable the isolation between the power domain P1 and the power domain P2. As a result, all circuits (or most circuits) in the power supply management device 100 may perform normal operations.

With the above steps, the comparator circuit 120 may generate the flag signal VF when the power supply management device 100 enters the power saving mode for the first time, and the control circuit 130 may record and store the flag signal VF to determine whether the external power supply circuit 100A exists in the current application environment. As a result, in subsequent operations, the control circuit 130 may determine whether to turn off the internal power supply circuit 110 according to the flag signal VF, and utilize the supply voltage VP2 from the external power supply circuit 100A to drive the circuits 140[0]-140[4].

For example, reference is made to FIG. 3B. In step S311, operating in normal mode, and whether the flag signal is a predetermined logic value (e.g., the first logic value as mentioned above) is determined. If the flag signal VF is not the predetermined logic value (e.g., the logic value of 1), step S312 to step S316 are performed. If the flag signal VF is the predetermined logic value, step S321 is performed. Steps S312-S316 are respectively the same as steps S302-S306, and thus the repetitious descriptions are not further given. If the flag signal VF is not the predetermined logic value, it indicates that the external power supply circuit 100A does not exist in the application environment of the power supply management device 100 during the previous operation in the power saving mode. Therefore, the control circuit 130 may cooperate with the comparator circuit 120 and the isolation circuitry 150 to perform the same operations (i.e., step S311 to step S316) to determine whether the external power supply circuit 100A exists in the current application environment again, and update the flag signal VF accordingly.

In step S321, the internal power supply circuit is turned off. In step S322, the power isolation operation is performed, in order to isolate the first power domain (e.g., the power domain P1) from the second power domain (e.g., the power domain P2). In step S323, the switches are turned off (e.g., the switches T0-T4), and the power saving mode is entered. In step S324, the soft-start operation is performed, in order to gradually turn on the switches.

For example, if the flag signal VF is the predetermined logic value, it indicates that the external power supply circuit 100A exists in the application environment of the power supply management device 100 during the previous operation in the power saving mode. Thus, the control circuit 130 may turn off the internal power supply circuit 110. As a result, the node N1 may continuously receive the supply voltage VP2 from the external power supply circuit 100A. Afterwards, the control circuit 130 may perform the power isolation operation with the isolation circuitry 150 to isolate the power domain P1 from the power domain P2, and turn off the switches T0-T4. As a result, the switches T0-T4 does not transmit the supply voltage VP2 to the circuits 140[0]-140[4] to enter the power saving mode. Under this condition, the circuits 140[0]-140[4] are turned off, and circuits operate in the power domain P1 will be driven by the supply voltage VP2. Afterwards, when the power supply management device 100 is going to exit the power saving mode, the control circuit 130 may perform the soft-start operation to output the control bits C[0]-C[4], in order to gradually turn on the switches T0-T4. As a result, the external power supply circuit 100A may power (or drive) the circuits 140[0]-140[4] via the switches T0-T4 (i.e., providing the supply voltage VP2). Afterwards, the control circuit 130 may control the clock generator in the at least one circuit 160 to start providing clock signal(s) required by various circuits, and control the isolation circuitry 150 to disable the isolation between the power domain P1 and the power domain P2 (i.e., step S316). As a result, all circuits (or most circuits) in the power supply management device 100 may perform normal operations.

The above description of operations and/or steps in FIG. 2, FIG. 3A, and/or FIG. 3B include exemplary operations, but operations and/or steps in FIG. 2, FIG. 3A, and/or FIG. 3B are not necessarily performed in the order described above. Operations and/or steps in FIG. 2, FIG. 3A, and/or FIG. 3B can be added, replaced, changed order, and/or eliminated, or operations and/or steps in FIG. 2, FIG. 3A, and/or FIG. 3B can be executed simultaneously or partially simultaneously as appropriate, in accordance with the spirit and scope of various embodiments of the present disclosure.

As mentioned above, the power supply management device and the power supply management method in some embodiments of the present disclosure are able to detect whether an external power supply circuit exists in a current environment without utilizing an additional connection port. If the external power supply circuit exists in the current environment, the power supply management device and the power supply management method are able to be automatically switched to utilize the voltage provided from the external power supply circuit without utilizing an additional connection port. As a result, the number of required ports in the power supply management device can be reduced, and the external power supply voltage can be utilized in an efficient way to lower the operating temperature of the power supply management device.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry.

Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A power supply management device, comprising:
   an internal power supply circuit configured to output a first supply voltage to a node;
   a plurality of switches coupled between the node and a plurality of first circuits;
   a comparator circuit configured to compare a voltage on the node with a reference voltage when the node does not receive the first supply voltage to generate a flag signal; and
   a control circuit configured to determine whether the node receives a second supply voltage from an external power supply circuit according to the flag signal,
   wherein if the node receives the second supply voltage, the control circuit is further configured to turn off the internal power supply circuit and gradually turn on the plurality of switches, in order to provide the second supply voltage to the plurality of first circuits via the plurality of switches.

2. The power supply management device of claim 1, wherein if the node does not receive the second supply voltage, the control circuit is further configured to turn on the internal power supply circuit and gradually turn on the plurality of switches, in order to provide the first supply voltage to the plurality of first circuits via the plurality of switches.

3. The power supply management device of claim 1, wherein the control circuit is further configured to perform a soft-start operation to generate a plurality of control bits to gradually turn on the plurality of switches, in order to transmit the first supply voltage or the second supply voltage to the plurality of first circuits.

4. The power supply management device of claim 1, wherein the control circuit does not receive the flag signal via a connection port of the power supply management device.

5. The power supply management device of claim 4, wherein the connection port is a general purpose input/output (GPIO) pin.

6. The power supply management device of claim 1, wherein the plurality of first circuits are turned off in a power saving mode.

7. The power supply management device of claim 6, wherein the comparator circuit is configured to generate the flag signal when the plurality of first circuits operate in the power saving mode for the first time, and the control circuit is further configured to store the flag signal when the plurality of first circuits operate in the power saving mode for the first time.

8. The power supply management device of claim 1, wherein the internal power supply circuit, the plurality of switches, the comparator circuit, and the control circuit are configured to operate in a first power domain, the plurality of first circuits are configured to operate in a second power domain, and when the power supply management device enters a power saving mode for the first time, the control circuit is configured to perform a power isolation operation to isolate the first power domain from the second power domain, and turn off the internal power supply circuit to store the flag signal.

9. A power supply management method, comprising:
   comparing a voltage on a node with a reference voltage when the node does not receive a first supply voltage to generate a flag signal, wherein the node is coupled to a plurality of switches and a plurality of first circuits, and the first supply voltage is from an internal power supply circuit;
   determining whether the node receives a second supply voltage from an external power supply circuit according to the flag signal; and
   if the node receives the second supply voltage, turning off the internal power supply circuit and gradually turning on the plurality of switches, in order to provide the second supply voltage to the plurality of first circuits via the plurality of switches.

10. The power supply management method of claim 9, further comprising:
    if the node does not receive the second supply voltage, turning on the internal power supply circuit and gradually turning on the plurality of switches, in order to provide the first supply voltage to the plurality of first circuits via the plurality of switches.

11. The power supply management method of claim 9, further comprising:
    performing a soft-start operation to generate a plurality of control bits to respectively turn on the plurality of switches, in order to transmit the first supply voltage or the second supply voltage to the plurality of first circuits.

12. The power supply management method of claim 9, wherein the flag signal is transmitted to a control circuit to determine whether the node receives the second supply voltage by the control circuit, and the control circuit does not receive the flag signal via a connection port.

13. The power supply management method of claim 12, wherein the connection port is a general purpose input/output (GPIO) pin.

14. The power supply management method of claim 9, wherein the plurality of first circuits are turned off in a power saving mode.

15. The power supply management method of claim 14, wherein comparing the voltage on the node with the reference voltage when the node does not receive a first supply voltage to generate the flag signal comprises:
    generating the flag signal when the plurality of first circuits operate in the power saving mode for the first time.

16. The power supply management method of claim 15, further comprising:
    storing the flag signal when the plurality of first circuits operate in the power saving mode for the first time.

17. The power supply management method of claim 9, the internal power supply circuit, the plurality of switches, the plurality of first circuits are arranged in a system, the internal power supply circuit and the plurality of switches are configured to operate in a first power domain, the plurality of first circuits are configured to operate in a second power domain, and the power supply management method further comprises:
    when the system enters a power saving mode for the first time, performing a power isolation operation to isolate the first power domain from the second power domain; and turning off the internal power supply circuit to store the flag signal.

\* \* \* \* \*